United States Patent
Davé

(10) Patent No.: US 7,742,415 B1
(45) Date of Patent: Jun. 22, 2010

(54) NON-INTRUSIVE KNOWLEDGE SUITE FOR EVALUATION OF LATENCIES IN IP NETWORKS

(75) Inventor: Nikhil Davé, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 399 days.

(21) Appl. No.: 11/862,094

(22) Filed: Sep. 26, 2007

(51) Int. Cl.
H04L 12/26 (2006.01)
H04J 3/06 (2006.01)
G06F 15/173 (2006.01)

(52) U.S. Cl. .................. 370/231; 370/236; 370/519; 709/224

(58) Field of Classification Search ...... 370/235–238.1, 370/503–523; 709/225, 232–233
See application file for complete search history.

(56) References Cited

U.S. PATENT DOCUMENTS

| | | | |
|---|---|---|---|
| 6,442,141 B1 * | 8/2002 | Borella et al. | 370/248 |
| 7,080,160 B2 * | 7/2006 | Cognet et al. | 709/248 |
| 7,113,485 B2 * | 9/2006 | Bruckman | 370/252 |
| 7,289,451 B2 * | 10/2007 | Bruhn | 370/252 |
| 7,508,769 B1 * | 3/2009 | Duffield et al. | 370/252 |
| 7,603,460 B2 * | 10/2009 | Adya et al. | 709/224 |
| 2005/0068894 A1 | 3/2005 | Yu et al. | |
| 2007/0217343 A1 | 9/2007 | Znamova et al. | |

OTHER PUBLICATIONS

Karn & Partridge, 1.0.—TCP Round-Trip Time Estimates, Summary, 3 pages, www.opalsoft.net/qos/TCP-10.htm.
J.Dunn and C. Martin, Terminology for ATM ABR Benchmarking, Memorandum, Jun. 2001, 15 pages, The Internet Society, Ellicott City, MD, www.cse.ohio-state.edu/cgi-bin/rfc/rfc3134.html.
J. Aikat, J. Kaur, F. Donelson Smith, and K. Jeffay; Variability in TCP Round-trip Times, IMC '03, ACM 1-58113-773-7/03/0010, Oct. 27-29, 2003.
Author Unknown; ACE, Analytics for Networked Applications, Product Brochure by OPNET Technologies, Inc., believed to have been first published on the internet Jun. 2007.

* cited by examiner

Primary Examiner—Tri H Phan
(74) Attorney, Agent, or Firm—Kyle Eppele; J. Eric Anderson

(57) ABSTRACT

A determination of latency in IP networks is performed by sensing packets, determining a status of the sensed packets and comparing original packets with acknowledgements (ACKs). A packet header on a physical layer interface (e.g., int 0) is sensed. A determination is made of a sensed packet status. If the packet is sensed, a hashed record of the packet header is created, including a local clock time of when the packet was sensed. A determination is made as to whether the packet represents an ACK to a previously sensed TCP packet. If the packet represents an ACK to a previously sensed packet, a time delay between the previous sensing of the packet and the ACK is calculated. The time delay is the TCP ACK Round Trip Time (TCP RTT).

14 Claims, 1 Drawing Sheet

NON-INTRUSIVE KNOWLEDGE SUITE FOR EVALUATION OF LATENCIES IN IP NETWORKS

FEDERALLY-SPONSORED RESEARCH AND DEVELOPMENT

This invention (Navy Case No. 96439) was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil.

BACKGROUND

1. Field of The Invention

This invention relates to computer network latency testing as applied to TCP.

2. Background of the Invention

Tools such as network managers and sniffers are used to determine network latency by transmitting a sample packet or message through a network interface. Typical network interfaces include ethernet interfaces and other connections to a network such as the internet. Typical tools include ping, tracert, and hardware or software tools intended to test interface device response. One software tool used for this purpose is tcpdump.

Traditional tools such as network managers and sniffers report only the quantity of data that has passed an interface in a network. These tools provide little information on global transit times of packets and data across the entire network space of interest to the user.

As mentioned, tcpdump provides a port sniffing function. Tcpdump operates with the interface in promiscuous mode, and allows the user to intercept and display TCP/IP and other packets being transmitted or received over a network to which the computer is attached. Tcpdump is a Unix-based program, although non-Unix implementations have been developed, including WinDump, which is considered to be a port of tcpdump to Windows.

On most operating systems, a user must have superuser privileges to use tcpdump due to its use of promiscuous mode, and due to the fact that various Unix network packet capturing schemes (raw sockets, special devices, etc.) require elevated privileges. The user may optionally apply any number of bpf-based filters to render the output more usable on networks with a high volume of traffic. Tcpdump is used for debugging operations related to network communications, routing and latency. In addition, tcpdump has the capability of monitoring user activity, as a result of its operation as a packet sniffer.

Tcpdump prints out the headers of packets on a network interface that match the Boolean expression. It can also be run with the -w flag, which causes it to save the packet data to a file for later analysis, and/or with the -b flag, which causes it to read from a saved packet file rather than to read packets from a network interface. In all cases, only packets that match expression will be processed by tcpdump.

Tcpdump will, if not run with the -c flag, continue capturing packets until it is interrupted by a SIGINT signal (generated, for example, by typing your interrupt character, typically control-C) or a SIGTERM signal (typically generated with the kill(1) command); if run with the -c flag, it will capture packets until it is interrupted by a SIGINT or SIGTERM signal or the specified number of packets have been processed.

When tcpdump finishes capturing packets, it will report counts of:

a. packets "received by filter" (the meaning of this depends on the OS on which you're running tcpdump, and possibly on the way the OS was configured—if a filter was specified on the command line, on some OSes it counts packets regardless of whether they were matched by the filter expression, and on other OSes it counts only packets that were matched by the filter expression and were processed by tcp dump);

b. packets "dropped by kernel" (this is the number of packets that were dropped, due to a lack of buffer space, by the packet capture mechanism in the OS on which tcpdump is running, if the OS reports that information to applications; if not, it will be reported as 0).

The general description of the operation of tcpdump can be seen from the man page:

TABLE 1

Tcpdump Man Page

> man tcpdump
tcpdump - dump traffic on a network
SYNOPSIS
  tcpdump [ -adeflnNOpqRStuvxX ] [ -c count ]
    [ -C file size ] [ -F file ]
    [ -i interface ] [ -m module ] [ -r file ]
    [ -s snaplen ] [ -T type ] [ -w file ]
    [ -E algo:secret ] [ expression ]
DESCRIPTION
  Tcpdump prints out the headers of packets on a network
  interface that match the boolean expression. It can also
  be run with the -w flag, which causes it to save the
  packet data to a file for later analysis, and/or with the
  -b flag, which causes it to read from a saved packet file
  rather than to read packets from a network interface. In
  all cases, only packets that match expression will be
  processed by tcpdump.
  Tcpdump will, if not run with the -c flag, continue
  capturing packets until it is interrupted by a SIGINT signal
  (generated, for example, by typing your interrupt character, typically control-C) or a SIGTERM signal (typically
  generated with the kill(1) command); if run with the -c
  flag, it will capture packets until it is interrupted by a
  SIGINT or SIGTERM signal or the specified number of packets
  have been processed.
  When tcpdump finishes capturing packets, it will report
  counts of:
    packets "received by filter" (the meaning of this
    depends on the OS on which you're running tcpdump,
    and possibly on the way the OS was configured - if
    a filter was specified on the command line, on some
    OSes it counts packets regardless of whether they
    were matched by the filter expression, and on other
    OSes it counts only packets that were matched by
    the filter expression and were processed by tcp
    dump);
    packets "dropped by kernel" (this is the number
    of packets that were dropped, due to a lack of
    buffer space, by the packet capture mechanism in
    the OS on which tcpdump is running, if the OS
    reports that information to applications; if not,
    it will be reported as 0).
  On platforms that support the SIGINFO signal, such as most
  BSDs, it will report those counts when it receives a SIG
  INFO signal (generated, for example, by typing your "status" character, typically control-T) and will continue
  you have special privileges:
  Under SunOS 3.x or 4.x with NIT or BPF:
    You must have read access to /dev/nit or /dev/bpf*.
  Under Solaris with DLPI:
    You must have read/write access to the network
    pseudo device, e.g. /dev/le. On at least some
    versions of Solaris, however, this is not sufficient to allow tcpdump to capture in promiscuous
    mode; on those versions of Solaris, you must be TABLE 1-continued Tcpdump Man Page root, or tcpdump must be installed setuid to root, in order to capture in promiscuous mode.
Under HP-UX with DLPI:
    You must be root or tcpdump must be installed setuid to root.
Under IRIX with snoop:
    You must be root or tcpdump must be installed setuid to root.
Under Linux:
    You must be root or tcpdump must be installed setuid to root.
Under Ultrix and Digital UNIX:
    Once the super-user has enabled promiscuous-mode operation using pfconfig(8), any user may capture network traffic with tcpdump.
Under BSD:
    You must have read access to /dev/bpf*.
Reading a saved packet file doesn't require special privileges.
OPTIONS

| Option | Description |
|---|---|
| -a | Attempt to convert network and broadcast addresses to names. |
| -c | Exit after receiving count packets. |
| -C | Before writing a raw packet to a savefile, check whether the file is currently larger than file_size and, if so, close the current savefile and open a new one. Savefiles after the first savefile will have the name specified with the -w flag, with a number after it, starting at 2 and continuing upward. The units of file_size are millions of bytes (1,000,000 bytes, not 1,048,576 bytes). |
| -dd | Dump packet-matching code as a C program fragment. |
| -ddd | Dump packet-matching code as decimal numbers (preceded with a count). |
| -e | Print the link-level header on each dump line. |
| -E | Use algo:secret for decrypting IPsec ESP packets. Algorithms may be des-cbc, 3des-cbc, blowfish-cbc, rc3-cbc, cast128-cbc, or none. The default is des-cbc. The ability to decrypt packets is only present if tcpdump was compiled with cryptography enabled, secret the ascii text for ESP secret key. We cannot take arbitrary binary value at this moment. The option assumes RFC2406 ESP, not RFC1827 ESP. The option is only for debugging purposes, and the use of this option with truly 'secret' key is discouraged. By presenting IPsec secret key onto command line you make it visible to others, via ps(1) and other occasions. |
| -f | Print 'foreign' internet addresses numerically rather than symbolically (this option is intended to get around serious brain damage in Sun's yp server -- usually it hangs forever translating non-local internet numbers). |
| -F | Use file as input for the filter expression. An additional expression given on the command line is ignored. |
| -i | Listen on interface. If unspecified, tcpdump searches the system interface list for the lowest numbered, configured up interface (excluding loop back). Ties are broken by choosing the earliest match. On Linux systems with 2.2 or later kernels, an interface argument of "any" can be used to capture packets from all interfaces. Note that captures on the "any" device will not be done in promiscuous mode. |
| -l | Make stdout line buffered. Useful if you want to see the data while capturing it. E.g., "tcpdump -l | tee dat" or "tcpdump -l > dat & tail -f dat". |
| -m | Load SMI MIB module definitions from file module. This option can be used several times to load several MIB modules into tcpdump. numbers, etc.) to names. |
| -N | Don't print domain name qualification of host names. E.g., if you give this flag then tcpdump will print "nic" instead of "nic.ddn.mil". |
| -O | Do not run the packet-matching code optimizer. This is useful only if you suspect a bug in the optimizer. |
| -p | Don't put the interface into promiscuous mode. Note that the interface might be in promiscuous mode for some other reason; hence, '-p' cannot be used as an abbreviation for 'ether host {local-hw-addr} or ether broadcast'. |
| -q | Quick (quiet?) output. Print less protocol information so output lines are shorter. |
| -R | Assume ESP/AH packets to be based on old specification (RFCT825 to RFCT829). If specified, tcpdump will not print replay prevention field. Since there is no protocol version field in ESP/AH specification, tcpdump cannot deduce the version of ESP/AH protocol. |
| -r | Read packets from file (which was created with the -w option). Standard input is used if file is "-". |
| -S | Print absolute, rather than relative, TCP sequence numbers. |
| -s | Snarf snaplen bytes of data from each packet rather than the default of 68 (with SunOS's NIT, the minimum is actually 96). 68 bytes is adequate for IP, ICMP, TCP and UDP but may truncate protocol information from name server and NFS packets (see below). Packets truncated because of a limited snapshot are indicated in the output with "[|proto]", where proto is the name of the protocol level at which the truncation has occurred. Note that taking larger snapshots both increases the amount of time it takes to process packets and, effectively, decreases the amount of packet buffering. This may cause packets to be lost. You should limit snaplen to the smallest number that will capture the protocol information you're interested in. Setting snaplen to 0 means use the required length to catch whole packets. |
| -T | Force packets selected by "expression" to be intercedure Call), rtp (Real-Time Applications protocol), rtcp (Real-Time Applications control protocol), snmp (Simple Network Management Protocol), vat (Visual Audio Tool), and wb (distributed White Board). |
| -t | Don't print a timestamp on each dump line. |
| -tt | Print an unformatted timestamp on each dump line. |
| -ttt | Print a delta (in micro-seconds) between current and previous line on each dump line. |
| -tttt | Print a timestamp in default format proceeded by date on each dump line. -u Print undecoded NFS handles. |
| -v | (Slightly more) verbose output. For example, the time to live, identification, total length and options in an IP packet are printed. Also enables additional packet integrity checks such as verifying the IP and ICMP header checksum. |
| -vv | Even more verbose output. For example, additional fields are printed from NFS reply packets, and SMB packets are fully decoded. |
| -vvv | Even more verbose output. For example, telnet SB . . . SE options are printed in full. With -X telnet options are printed in hex as well. |
| -w | Write the raw packets to file rather than parsing and printing them out. They can later be printed with the -r option. Standard output is used if file is "-". |
| -x | Print each packet (minus its link level header) in hex. The smaller of the entire packet or snaplen bytes will be printed. |
| -X | When printing hex, print ascii too. Thus if -x is also set, the packet is printed in hex/ascii. This is very handy for analysing new protocols. Even if -x is not also set, some parts of some packets may be printed in hex/ascii. | expression
    selects which packets will be dumped. If no expression is given, all packets on the net will be TABLE 1-continued Tcpdump Man Page dumped. Otherwise, only packets for which expression is 'true' will be dumped.
ber) preceded by one or more qualifiers. There are three different kinds of qualifier:

type qualifiers say what kind of thing the id name or number refers to. Possible types are host, net and port. E.g., 'host foo', 'net 128.3', 'port 20'. If there is no type qualifier, host is assumed.

dir qualifiers specify a particular transfer direction to and/or from id. Possible directions are src, dst, src or dst and src and dst. E.g., 'src foo', 'dst net 128.3', 'src or dst port ftp-data'. If there is no dir qualifier, src or dst is assumed. For 'null' link layers (i.e. point to point protocols such as slip) the inbound and out bound qualifiers can be used to specify a desired direction.

proto qualifiers restrict the match to a particular protocol. Possible protos are: ether, fddi, tr, ip, ip6, arp, rarp, decnet, tcp and udp. E.g., 'ether src foo', 'arp net 128.3', 'tcp port 21'. If there is no proto qualifier, all protocols consistent with the type are assumed. E.g., 'src foo' means '(ip or arp or rarp) src foo' (except the latter is not legal syntax), 'net bar' means '(ip or arp or rarp) net bar' and 'port 53' means '(tcp or udp) port 53'.

['fddi' is actually an alias for 'ether'; the parser treats them identically as meaning "the data link level used on the specified network interface." FDDI headers contain Ethernet-like source and destination addresses, and often contain Ethernet-like packet types, so you can filter on these FDDI fields just as with the analogous Ether net fields. FDDI headers also contain other fields, but you cannot name them explicitly in a filter expression.

Similarly, 'tr' is an alias for 'ether'; the previous paragraph's statements about FDDI headers also apply to Token Ring headers.]

In addition to the above, there are some special 'primitive' keywords that don't follow the pattern: gateway, broadcast, less, greater and arithmetic expressions. All of these are described below.

tives. E.g., 'host foo and not port ftp and not port ftp-data'. To save typing, identical qualifier lists can be omitted. E.g., 'tcp dst port ftp or ftp-data or domain' is exactly the same as 'tcp dst port ftp or tcp dst port ftp-data or tcp dst port domain'.

Allowable primitives are:

dst host host
 True if the IPv4/v6 destination field of the packet is host, which may be either an address or a name.

src host host
 True if the IPv4/v6 source field of the packet is host.

host host
 True if either the IPv4/v6 source or destination of the packet is host. Any of the above host expressions can be prepended with the keywords, ip, arp, rarp, or ip6 as in:
  ip host host
 which is equivalent to:
  ether proto \ip and host host
 If host is a name with multiple IP addresses, each address will be checked for a match.

ether dst ehost
 True if the ethernet destination address is ehost. Ehost may be either a name from /etc/ethers or a number (see ethers(3N) for numeric format).

ether src ehost
 True if the ethernet source address is ehost.

ether host ehost
 True if either the ethernet source or destination address is ehost.

gateway host
 True if the packet used host as a gateway. I.e., the ethernet source or destination address was host but neither the IP source nor the IP destination was host. Host must be a name and must be found both by the machine's host-name-to-IP-address resolution mechanisms (host name file, DNS, NIS, etc.). (An equivalent expression is
  ether host ehost and not host host
 which can be used with either names or numbers for host / ehost.) This syntax does not work in IPv6-enabled configuration at this moment.

dst net net
 True if the IPv4/v6 destination address of the packet has a network number of net. Net may be either a name from /etc/networks or a network number (see networks(4) for details).

src net net
 True if the IPv4/v6 source address of the packet has a network number of net.

net net
 True if either the IPv4/v6 source or destination address of the packet has a network number of net.

net net mask netmask
 True if the IP address matches net with the specific netmask. May be qualified with src or dst. Note that this syntax is not valid for IPv6 net.

net net/len
 True if the IPv4/v6 address matches net with a netmask len bits wide. May be qualified with src or dst.

dst port port
 True if the packet is ip/tcp, ip/udp, ip6/tcp or ip6/udp and has a destination port value of port. The port can be a number or a name used in /etc/services (see tcp(4P) and udp(4P)). If a name is used, both the port number and protocol are checked. If a number or ambiguous name is used, only the port number is checked (e.g., dst port 513 will print both tcp/login traffic and udp/who traffic, and port domain will print both tcp/domain and udp/domain traffic).

src port port
 True if the packet has a source port value of port.
 True if either the source or destination port of the packet is port. Any of the above port expressions can be prepended with the keywords, tcp or udp, as in:
  tcp src port port
 which matches only tcp packets whose source port is port.

less length
 True if the packet has a length less than or equal to length. This is equivalent to:
  len <= length.

greater length
 True if the packet has a length greater than or equal to length. This is equivalent to:
  len >= length.

ip proto protocol
 True if the packet is an IP packet (see ip(4P)) of protocol type protocol. Protocol can be a number or one of the names icmp, TABLE 1-continued Tcpdump Man Page icmp6, igmp, igrp, pim, ah, esp, vrrp, udp,
or tcp. Note that the identifiers tcp, udp,
and icmp are also keywords and must be
escaped via backslash (\), which is \\ in
the C-shell. Note that this primitive does
not chase the protocol header chain.
ip6 proto protocol
    True if the packet is an IPv6 packet of protocol type protocol. Note that this primitive does not chase the protocol header chain.
ip6 protochain protocol
    True if the packet is IPv6 packet, and contains protocol header with type protocol in its protocol header chain. For example,
        ip6 protochain 6
    matches any IPv6 packet with TCP protocol header in the protocol header chain. The packet may contain, for example, authentication header, routing header, or hop-by-hop option header, between IPv6 header and TCP header. The BPF code emitted by this primitive is complex and cannot be optimized by BPF optimizer code in tcpdump, so this can be somewhat slow.
ip protochain protocol
    Equivalent to ip6 protochain protocol, but
    True if the packet is an ethernet broadcast packet. The ether keyword is optional.
ip broadcast
    True if the packet is an IP broadcast packet. It checks for both the all-zeroes and all-ones broadcast conventions, and looks up the local subnet mask.
ether multicast
    True if the packet is an ethernet multicast packet. The ether keyword is optional. This is shorthand for 'ether[0] & 1 != 0'.
ip multicast
    True if the packet is an IP multicast packet.
ip6 multicast
    True if the packet is an IPv6 multicast packet.
ether proto protocol
    True if the packet is of ether type protocol. Protocol can be a number or one of the names ip, ip6, arp, rarp, atalk, aarp, dec net, sca, lat, mopdl, moprc, iso, stp, ipx, or netbeui. Note these identifiers are also keywords and must be escaped via backslash (\).
    [In the case of FDDI (e.g., 'fddi protocol arp') and Token Ring (e.g., 'tr protocol arp'), for most of those protocols, the protocol identification comes from the 802.2 Logical Link Control (LLC) header, which is usually layered on top of the FDDI or Token Ring header.
    When filtering for most protocol identifiers on FDDI or Token Ring, tcpdump checks only the protocol ID field of an LLC header in so-called SNAP format with an Organizational Unit Identifier (OUI) of 0x000000, for encapsulated Ethernet; it doesn't check whether the packet is in SNAP format with an OUI of 0x000000.
    The exceptions are iso, for which it checks the DSAP (Destination Service Access Point) and SSAP (Source Service Access Point) fields of the LLC header, stp and netbeui, packet with an OUT of 0x080007 and the Appletalk etype.
    In the case of Ethernet, tcpdump checks the Ethernet type field for most of those protocols; the exceptions are iso, sap, and net beui, for which it checks for an 802.3 frame and then checks the LLC header as it does for FDDT and Token Ring, atalk, where it checks both for the Appletalk etype in an Ethernet frame and for a SNAP-format packet as it does for FDDT and Token Ring, aarp, where it checks for the Appletalk ARP etype in either an Ethernet frame or an 802.2 SNAP frame with an OUT of 0x000000, and ipx, where it checks for the IPX etype in an Ethernet frame, the IPX DSAP in the LLC header, the 802.3 with no LLC header encapsulation of IPX, and the IPX etype in a SNAP frame.]
decnet src host
    True if the DECNET source address is host, which may be an address of the form "10.123", or a DECNET host name. [DECNET host name support is only available on Ultrix systems that are configured to run DECNET.]
decnet dst host
    True if the DECNET destination address is host.
decnet host host
    True if either the DECNET source or destination address is host.
ip, ip6, arp, rarp, atalk, aarp, decnet, iso, stp, ipx, netbeui
    Abbreviations for:
        ether proto p
    where p is one of the above protocols.
lat, moprc, mopdl
    Abbreviations for:
        ether proto p
    where p is one of the above protocols. Note that tcpdump does not currently know how to parse these protocols.
vlan [vlan_Id]
    True if the packet is an IEEE 802.1Q VLAN packet. If [vlan_id] is specified, only encountered in expression changes the decoding offsets for the remainder of expression on the assumption that the packet is a VLAN packet.
tcp, udp, icmp
    Abbreviations for:
        ip proto p or ip6 proto p
    where p is one of the above protocols.
iso proto protocol
    True if the packet is an OSI packet of protocol type protocol. Protocol can be a number or one of the names clnp, esis, or isis.
clnp, esis, isis
    Abbreviations for:
        iso proto p
    where p is one of the above protocols. Note that tcpdump does an incomplete job of parsing these protocols.
expr relop expr
    True if the relation holds, where relop is one of >, <, >=, <=, =, !=, and expr is an arithmetic expression composed of integer constants (expressed in standard C syntax), the normal binary operators [+, −, *, /, &, |], a length operator, and special packet data accessors. To access data inside the packet, use the following syntax:
        proto [ expr : size ]
    Proto is one of ether, fddi, tr, ip, arp, rarp, tcp, udp, icmp or ip6, and indicates the protocol layer for the index operation. Note that tcp, udp and other upper-layer protocol types only apply to IPv4, not IPv6 (this will be fixed in the future) . The byte offset, relative to the indicated protocol layer, is given by expr. Size is optional and indicates the number of bytes in the field of interest; it can be either TABLE 1-continued Tcpdump Man Page one, two, or four, and defaults to one. The
length operator, indicated by the keyword
len, gives the length of the packet.
For example, 'ether[0] & 1 != 0' catches all
multicast traffic. The expression 'ip[0] &
0xf != 5' catches all IP packets with
options. The expression 'ip[6:2] & 0x1fff =
0' catches only unfragmented datagrams and
frag zero of fragmented datagrams. This
always means the first byte of the TCP
header, and never means the first byte of an
intervening fragment.
Some offsets and field values may be
expressed as names rather than as numeric
values. The following protocol header field
offsets are available: icmptype (TCMP type
field), icmpcode (TCMP code field), and
tcpflags (TCP flags field).
The following TCMP type field values are
available: icmp-echoreply, icmp-unreach,
icmp-sourcequench, icmp-redirect, icmp-echo,
icmp-routeradvert, icmp-routersolicit, icmp-
timxceed, icmp-paramprob, icmp-tstamp, icmp-
tstampreply, icmp-ireq, icmp-ireqreply,
icmp-maskreq, icmp-maskreply.
The following TCP flags field values are
available: tcp-fin, tcp-syn, tcp-rst, tcp-
push, tcp-push, tcp-ack, tcp-urg.
Primitives may be combined using:
A parenthesized group of primitives and
operators (parentheses are special to the
Shell and must be escaped).
Negation ('!' or 'not').
Concatenation ('&&' or 'and').
Alternation ('||' or 'or').
Negation has highest precedence. Alternation and
concatenation have equal precedence and associate
left to right. Note that explicit and tokens, not
juxtaposition, are now required for concatenation.
If an identifier is given without a keyword, the
most recent keyword is assumed. For example,
   not host vs and ace
is short for
   not host vs and host ace
which should not be confused with
   not ( host vs or ace )
Expression arguments can be passed to tcpdump as
either a single argument or as multiple arguments,
whichever is more convenient. Generally, if the
expression contains Shell metacharacters, it is
before being parsed.
EXAMPLES
To print all packets arriving at or departing from sun
down:
   tcpdump host sundown
To print traffic between helios and either hot or ace:
   tcpdump host helios and \( hot or ace \)
To print all IP packets between ace and any host except
helios:
   tcpdump ip host ace and not helios
To print all traffic between local hosts and hosts at
Berkeley:
   tcpdump net ucb-ether
To print all ftp traffic through internet gateway snup:
(note that the expression is quoted to prevent the shell
from (mis-)interpreting the parentheses):
   tcpdump 'gateway snup and (port ftp or ftp-data)'
To print traffic neither sourced from nor destined for
local hosts (if you gateway to one other net, this stuff
should never make it onto your local net).
   tcpdump ip and not net localnet
To print the start and end packets (the SYN and FIN pack-
ets) of each TCP conversation that involves a non-local
host.
   tcpdump 'tcp[tcpflags] & (tcp-syn|tcp-fin) 0 and not src
and dst net localnet'
To print IP packets longer than 576 bytes sent through TABLE 1-continued Tcpdump Man Page gateway snup:
   tcpdump 'gateway snup and ip[2:2] > 576'
To print IP broadcast or multicast packets that were not
sent via ethernet broadcast or multicast:
   tcpdump 'ether[0] & 1 = 0 and ip[16] >= 224'
To print all ICMP packets that are not echo
requests/replies (i.e., not ping packets);
   tcpdump 'icmp[icmptype] != icmp-echo and icmp[icmptype] !=
icmp-echoreply'
OUTPUT FORMAT
The output of tcpdump is protocol dependent. The follow-
ing gives a brief description and examples of most of the
formats.
Link Level Headers
addresses, protocol, and packet length are printed.
On FDDI networks, the '-e' option causes tcpdump to print
the 'frame control' field, the source and destination
addresses, and the packet length. (The 'frame control'
field governs the interpretation of the rest of the
packet. Normal packets (such as those containing IP data
grams) are 'async'packets, with a priority value between
0 and 7; for example, 'async4'. Such packets are assumed
to contain an 802.2 Logical Link Control (LLC) packet; the
LLC header is printed if it is not an ISO datagram or a
so-called SNAP packet.
On Token Ring networks, the '-e' option causes tcpdump to
print the 'access control' and 'frame control' fields, the
source and destination addresses, and the packet length.
As on FDDI networks, packets are assumed to contain an LLC
packet. Regardless of whether the '-e' option is speci-
fied or not, the source routing information is printed for
source-routed packets.
(N.B. The following description assumes familiarity with
the SLIP compression algorithm described in RFC-1144.)
On SLIP links, a direction indicator ("I" for inbound,
"O" for outbound), packet type, and compression informa-
tion are printed out. The packet type is printed first.
The three types are ip, utcp, and ctcp. No further link
information is printed for ip packets. For TCP packets,
the connection identifier is printed following the type.
If the packet is compressed, its encoded header is printed
out. The special cases are printed out as *S+n and *SA+n,
where n is the amount by which the sequence number (or
sequence number and ack) has changed. If it is not a spe-
cial case, zero or more changes are printed. A change is
indicated by U (urgent pointer), W (window), A (ack), S
(sequence number), and I (packet ID), followed by a delta
(+n or -n), or a new value (=n) . Finally, the amount of
data in the packet and compressed header length are
printed.
For example, the following line shows an outbound com-
pressed TCP packet, with an implicit connection identi-
fier; the ack has changed by 6, the sequence number by 49,
and the packet ID by 6; there are 3 bytes of data and 6
bytes of compressed header:
   O ctcp * A+6 S+49 I+6 3 (6)
ARP/RARP Packets
Arp/rarp output shows the type of request and its argu-
ments. The format is intended to be self explanatory.
   arp who-has csam tell rtsg
   arp reply csam is-at CSAM
The first line says that rtsg sent an arp packet asking
for the ethernet address of internet host csam. Csam
replies with its ethernet address (in this example, ether
net addresses are in caps and internet addresses in lower
case).
This would look less redundant if we had done tcpdump -n:
   arp who-has 128.3.254.6 tell 128.3.254.68
   arp reply 128.3.254.6 is-at 02:07:01:00:01:c4
If we had done tcpdump -e, the fact that the first packet
is broadcast and the second is point-to-point would be
visible:
   RTSG Broadcast 0806 64: arp who-has csam tell rtsg
   CSAM RTSG 0806 64: arp reply csam is-at CSAM
For the first packet this says the ethernet source address
is RTSG, the destination is the ethernet broadcast
address, the type field contained hex 0806 (type TABLE 1-continued Tcpdump Man Page ETHER_ARP) and the total length was 64 bytes.
TCP Packets
(N.B.:The following description assumes familiarity with
the TCP protocol described in RFC-793. If you are not
familiar with the protocol, neither this description nor
tcpdump will be of much use to you.)
The general format of a tcp protocol line is:
    src > dst: flags data-seqno ack window urgent options
Src and dst are the source and destination IP addresses
and ports. Flags are some combination of S (SYN), F
(FIN), P (PUSH) or R (RST) or a single +1 .' (no flags).
Data-seqno describes the portion of sequence space covered
by the data in this packet (see example below) . Ack is
sequence number of the next data expected the other direc-
tion on this connection. Window is the number of bytes of
receive buffer space available the other direction on this
connection. Urg indicates there is 'urgent' data in the
packet. Options are tcp options enclosed in angle brack-
ets (e.g., <mss 1024>).
Src, dst and flags are always present. The other fields
depend on the contents of the packet's tcp protocol header
and are output only if appropriate.
Here is the opening portion of an rlogin from host rtsg to
host csam.
    rtsg.1023 > csam.login: S 768512:768512(0) win 4096 <mss
1024>
    csam.login > rtsg.1023: S 947648:947648(0) ack 768513 win
4096 <mss 1024>
    rtsg.1023 > csam.login: . ack 1 win 4096
    rtsg.1023 > csam.login: P 2:21(19) ack 1 win 4096
    csam.login > rtsg.1023: P 1:2(1) ack 21 win 4077
    csam.login > rtsg.1023: P 2:3(1) ack 21 win 4077 urg 1
    csam.login > rtsg.1023: P 3:4(1) ack 21 win 4077 urg 1
The first line says that tcp port 1023 on rtsg sent a
packet to port login on csam. The S indicates that the
SYN flag was set. The packet sequence number was 768512
and it contained no data. (The notation is
'first:last(nbytes)' which means 'sequence numbers first
up to but not including last which is nbytes bytes of user
data'.) There was no piggy-backed ack, the available
receive window was 4096 bytes and there was a max-segment-
size option requesting an mss of 1024 bytes.
Csam replies with a similar packet except it includes a
piggy-backed ack for rtsg's SYN. Rtsg then acks csam's
SYN. The '.' means no flags were set. The packet con-
tained no data so there is no data sequence number. Note
that the ack sequence number is a small integer (1) . The
first time tcpdump sees a tcp 'conversation', it prints
the sequence number from the packet. On subsequent pack
ets of the conversation, the difference between the cur-
rent packet's sequence number and this initial sequence
number is printed. This means that sequence numbers after
the first can be interpreted as relative byte positions in
the conversation's data stream (with the first data byte
each direction being '1'). '-S' will override this fea-
ture, causing the original sequence numbers to be output.
On the 6th line, rtsg sends csam 19 bytes of data (bytes 2
through 20 in the rtsg -> csam side of the conversation)
The PUSH flag is set in the packet. On the 7th line, csam
says it's received data sent by rtsg up to but not includ-
ing byte 21. Most of this data is apparently sitting in
the socket buffer since csam's receive window has gotten
19 bytes smaller. Csam also sends one byte of data to
rtsg in this packet. On the 8th and 9th lines, csam sends
two bytes of urgent, pushed data to rtsg.
If the snapshot was small enough that tcpdump didn't cap-
ture the full TCP header, it interprets as much of the
header as it can and then reports "[|tcp]" to indicate
the remainder could not be interpreted. If the header
contains a bogus option (one with a length that's either
too small or beyond the end of the header), tcpdump
reports it as "[bad opt]" and does not interpret any
further options (since it's impossible to tell where they
start) . If the header length indicates options are pre-
sent but the IP datagram length is not long enough for the
options to actually be there, tcpdump reports it as "[bad
hdr length]"

There are 8 bits in the control bits section of the TCP
header:
    CWR | ECE | URG | ACK | ESH | RST | SYN | FIN
Let's assume that we want to watch packets used in estab-
lishing a TCP connection. Recall that TCP uses a 3-way
handshake protocol when it initializes a new connection;
the connection sequence with regard to the TCP control
bits is
    1) Caller sends SYN
    2) Recipient responds with SYN, ACK
    3) Caller sends ACK
Now we're interested in capturing packets that have only
the SYN bit set (Step 1) . Note that we don't want packets
from step 2 (SYN-ACK), just a plain initial SYN. What we
need is a correct filter expression for tcpdump.
Recall the structure of a TCP header without options:

```
0                    15                           31
----------------------------------------------------
|     source port     |      destination port     |
----------------------------------------------------
|               sequence number                   |
----------------------------------------------------
|             acknowledgment number               |
----------------------------------------------------
| HL | rsvd | C|E|U|A|P|R|S|F |    window size    |
----------------------------------------------------
|     TCP checksum    |      urgent pointer       |
----------------------------------------------------
```

A TCP header usually holds 20 octets of data, unless
options are present. The first line of the graph contains
octets 0-3, the second line shows octets 4-7 etc.
Starting to count with 0, the relevant TCP control bits
are contained in octet 13:

```
0         7|        15|         23|           31
-----------|----------|-----------|---------------
| HL | rsvd | C|E|U|A|P|R|S|F |    window size    |
-----------|----------|-----------|---------------
|          |  13th octet |        |               |
```

Let's have a closer look at octet no. 13:

```
|-----------|
|7 5 3 0|
```

These are the TCP control bits we are interested in. We
have numbered the bits in this octet from 0 to 7, right to
left, so the ESH bit is bit number 3, while the URG bit is
number 5.
Recall that we want to capture packets with only SYN set.
Let's see what happens to octet 13 if a TCP datagram
arrives with the SYN bit set in its header:

```
|C|E|U|A|P|R|S |F|
-------------------
|0 0 0 0 0 0 1 0|
-------------------
|7 6 5 4 3 2 1 0|
```

Looking at the control bits section we see that only bit
number 1 (SYN) is set.
Assuming that octet number 13 is an 8-bit unsigned integer
in network byte order, the binary value of this octet is
    00000010
and its decimal representation is $$\underset{0*2^7}{7} + \underset{0*2^6}{6} + \underset{0*2^5}{5} + \underset{0*2^4}{4} + \underset{0*2^3}{3} + \underset{0*2^2}{2} + \underset{1*2^1}{1} + \underset{0*2^0}{0} = 2$$

We're almost done, because now we know that if only SYN is
set, the value of the 13th octet in the TCP header, when
interpreted as a 8-bit unsigned integer in network byte
order, must be exactly 2.
This relationship can be expressed as TABLE 1-continued Tcpdump Man Page tcp[13] == 2
We can use this expression as the filter for tcpdump in
order to watch packets which have only SYN set:
    tcpdump -i x10 tcp[13] == 2
The expression says "let the 13th octet of a TCP datagram
have the decimal value 2", which is exactly what we want.
Now, let's assume that we need to capture SYN packets, but
we don't care if ACK or any other TCP control bit is set
at the same time. Let's see what happens to octet 13 when
a TCP datagram with SYN-ACK set arrives:

```
|C|E|U|A|P|R|S|F|
|---------------|
|7 6 5 4 3 2 1 0|
```

Now bits 1 and 4 are set in the 13th octet. The binary
value of octet 13 is
    00010010
which translates to decimal $$0*2^7 + 0*2^6 + 0*2^5 + 1*2^4 + 0*2^3 + 0*2^2 + 1*2^1 + 0*2^0 = 18$$

Now we can't just use 'tcp[13] == 18' in the tcpdump fil-
ter expression, because that would select only those pack-
ets that have SYN-ACK set, but not those with only SYN
set. Remember that we don't care if ACK or any other con-
trol bit is set as long as SYN is set.
In order to achieve our goal, we need to logically AND the
binary value of octet 13 with some other value to preserve
the SYN bit. We know that we want SYN to be set in any
case, so we'll logically AND the value in the 13th octet
with the binary value of a SYN:

```
    00010010 SYN-ACK           00000010 SYN
AND 00000010 (we want SYN) AND 00000010 (we want SYN)
    --------                   --------
=   00000010               =   00000010
```

We see that this AND operation delivers the same result
regardless whether ACK or another TCP control bit is set.
The decimal representation of the AND value as well as the
result of this operation is 2 (binary 00000010), so we
know that for packets with SYN set the following relation
must hold true:
    ( ( value of octet 13 ) AND ( 2 ) ) == ( 2 )
This points us to the tcpdump filter expression
    tcpdump -i x10 'tcp[13] & 2 == 2'
Note that you should use single quotes or a backslash in
the expression to hide the AND ('&') special character
from the shell.
UDE Packets
UDP format is illustrated by this rwho packet:
    actinide.who > broadcast.who: udp 84
This says that port who on host actinide sent a udp data
Some UDP services are recognized (from the source or des-
tination port number) and the higher level protocol infor-
mation printed. In particular, Domain Name service
requests (RFC-1034/1035) and Sun RPC calls (RFC-1050) to
NFS.
UDP Name Server Requests
(N.B.:The following description assumes familiarity with
the Domain Service protocol described in RFC-1035. If you
are not familiar with the protocol, the following descrip-
tion will appear to be written in greek.)
Name server requests are formatted as
    src > dst: id op? flags qtype qclass name (len)
    h2opolo.1538 > helios.domain: 3+ A? ucbvax.berkeley.edu. (37)
Host h2opolo asked the domain server on helios for an
address record (qtype=A) associated with the name ucb
vax.berkeley.edu. The query id was '3'. The '+' indi-
cates the recursion desired flag was set. The query
length was 37 bytes, not including the UDP and IP protocol
headers. The query operation was the normal one, Query,
so the op field was omitted. If the op had been anything TABLE 1-continued Tcpdump Man Page else, it would have been printed between the '3' and the
Similarly, the qclass was the normal one, C_IN, and
omitted. Any other qclass would have been printed immedi-
ately after the 'A'.
A few anomalies are checked and may result in extra fields
enclosed in square brackets: If a query contains an
answer, authority records or additional records section,
ancount, nscount, or arcount are printed as '[na]', '[nn]'
or '[nau]' where n is the appropriate count. If any of
the response bits are set (AA, PA or rcode) or any of the
'must be zero' bits are set in bytes two and three,
'[b2&3=x]' is printed, where x is the hex value of header
bytes two and three.
UDP Name Server Responses
Name server responses are formatted as
    src > dst: id op rcode flags a/n/au type class data (len)
    helios.domain > h2opolo.1538: 3 3/3/7 A 128.32.137.3 (273)
    helios.domain > h2opolo.1537: 2 NXDomain* 0/1/0 (97)
In the first example, hellos responds to query id 3 from
h2opolo with 3 answer records, 3 name server records and 7
additional records. The first answer record is type A
(address) and its data is internet address 128.32.137.3.
The total size of the response was 273 bytes, excluding
UDP and IP headers. The op (Query) and response code
(NoError) were omitted, as was the class (C_IN) of the A
response code of non-existent domain (NXDomain) with no
answers, one name server and no authority records. The
'*' indicates that the authoritative answer bit was set.
Since there were no answers, no type, class or data were
printed.
Other flag characters that might appear are '-' (recursion
available, RA, not set) and '|' (truncated message, TC,
set) . If the 'question' section doesn't contain exactly
one entry, '[nq]' is printed.
Note that name server requests and responses tend to be
large and the default snaplen of 68 bytes may not capture
enough of the packet to print. Use the -s flag to
increase the snaplen if you need to seriously investigate
name server traffic. '-s 128' has worked well for me.
SMB/CIFS decoding
tcpdump now includes fairly extensive SMB/CIFS/NBT decod-
ing for data on UDP/137, UDP/138 and TCP/139. Some primi-
tive decoding of IPX and NetBEUI SMB data is also done.
By default a fairly minimal decode is done, with a much
more detailed decode done if -v is used. Be warned that
with -v a single SMB packet may take up a page or more, so
only use -v if you really want all the gory details.
If you are decoding SMB sessions containing unicode
strings then you may wish to set the environment variable
USE_UNICODE to 1. A patch to auto-detect unicode srings
would be welcome.
For information on SMB packet formats and what all te
fields mean see www.cifs.org or the pub/samba/specs/
directory on your favourite samba.org mirror site. The
SMB patches were written by Andrew Tridgell
(tridge@ samba.org).
NFS Requests and Replies
Sun NFS (Network File System) requests and replies are
printed as:
    src.xid > dst.nfs: len op args
    src.nfs > dst.xid: reply stat len op results
    sushi.6709 > wrl.nfs: 112 readlink fh 21,24/10.73165
    wrl.nfs > sushi.6709: reply ok 40 readlink ". . . /var"
    sushi.201b > wrl.nfs:
        144 lookup fh 9,74/4096.6878 "xcolors"
In the first line, host sushi sends a transaction with id
6709 to wrl (note that the number following the src host
is a transaction id, not the source port) . The request
was 112 bytes, excluding the UDP and IP headers. The
operation was a readlink (read symbolic link) on file han-
dle (fh) 21,24/10.731657119. (If one is lucky, as in this
case, the file handle can be interpreted as a major, minor
device number pair, followed by the mode number and gen-
eration number.) Wrl replies 'ok' with the contents of
the link.
In the third line, sushi asks wrl to lookup the name
'xcolors' in directory file 9,74/4096.6878. Note that the TABLE 1-continued Tcpdump Man Page data printed depends on the operation type. The format is
intended to be self explanatory if read in conjunction
with an NFS protocol spec.
If the -v (verbose) flag is given, additional information
is printed. For example:
  sushi.1372a > wrl.nfs:
    148 read fh 21,11/12.195 8192 bytes @ 24576
  wrl.nfs > sushi.1372a:
    reply ok 1472 read REG 100664 ids 417/0 sz 29388
(-v also prints the IP header TTL, ID, length, and frag-
mentation fields, which have been omitted from this exam-
ple.) In the first line, sushi asks wrl to read 8192
bytes from file 21,11/12.195, at byte offset 24576. Wrl
replies 'ok'; the packet shown on the second line is the
first fragment of the reply, and hence is only 1472 bytes
long (the other bytes will follow in subsequent fragments,
but these fragments do not have NFS or even UDP headers
and so might not be printed, depending on the filter
expression used) . Because the -v flag is given, some of
the file attributes (which are returned in addition to the
file data) are printed: the file type ("REG", for regu-
lar file), the file mode (in octal), the uid and gid, and
the file size.
If the -v flag is given more than once, even more details
are printed.
Note that NFS requests are very large and much of the
detail won't be printed unless snaplen is increased. Try
using '-s 192' to watch NFS traffic.
NFS reply packets do not explicitly identify the RPC oper-
ation. Instead, tcpdump keeps track of "recent"
requests, and matches them to the replies using the trans-
action ID. If a reply does not closely follow the corre
Transarc AFS (Andrew File System) requests and replies are
printed as:
  src.sport > dst.dport: rx packet-type
  src.sport > dst.dport: rx packet-type service call call-
name args
  src.sport > dst.dport: rx packet-type service reply call-
name args
    elvis.7001 > pike.afsfs:
      rx data fs call rename old fid 536876964/1/1
".newsrc.new"
      new fid 536876964/1/1 ".newsrc"
    pike.afsfs > elvis.7001: rx data fs reply rename
In the first line, host elvis sends a RX packet to pike.
This was a RX data packet to the fs (fileserver) service,
and is the start of an RPC call. The RPC call was a
rename, with the old directory file id of 536876964/1/1
and an old filename of '.newsrc.new', and a new directory
file id of 536876964/1/1 and a new filename of '.newsrc'.
The host pike responds with a RPC reply to the rename call
(which was successful, because it was a data packet and
not an abort packet).
In general, all AFS RPCs are decoded at least by RPC call
name. Most AFS RPCs have at least some of the arguments
decoded (generally only the 'interesting' arguments, for
some definition of interesting).
The format is intended to be self-describing, but it will
probably not be useful to people who are not familiar with
the workings of AFS and RX.
If the -v (verbose) flag is given twice, acknowledgement
packets and additional header information is printed, such
as the the RX call ID, call number, sequence number,
serial number, and the RX packet flags.
If the -v flag is given twice, additional information is
printed, such as the the RX call ID, serial number, and
the RX packet flags. The MTU negotiation information is
also printed from RX ack packets.
If the -v flag is given three times, the security index
and service Id are printed.
Error codes are printed for abort packets, with the excep-
tion of Ubik beacon packets (because abort packets are
used to signify a yes vote for the Ubik protocol).
Note that AFS requests are very large and many of the
arguments won't be printed unless snaplen is increased.
Try using '-s 256' to watch AFS traffic.
ation. Instead, tcpdump keeps track of "recent"

TABLE 1-continued

Tcpdump Man Page requests, and matches them to the replies using the call
number and service ID. If a reply does not closely follow
the corresponding request, it might not be parsable.
KIP Appletalk (DDE in UDP)
Appletalk DDE packets encapsulated in UDP datagrams are
de-encapsulated and dumped as DDE packets (i.e., all the
UDE header information is discarded). The file
/etc/atalk.names is used to translate appletalk net and
node numbers to names. Lines in this file have the form
  number     name 1.254      ether
  16.1       icsd-net
  1.254.110  ace
The first two lines give the names of appletalk networks.
The third line gives the name of a particular host (a host
is distinguished from a net by the 3rd octet in the number
- a net number must have two octets and a host number must
have three octets.) The number and name should be sepa-
rated by whitespace (blanks or tabs). The
/etc/atalk.names file may contain blank lines or comment
lines (lines starting with a '#').
Appletalk addresses are printed in the form
  net.host.port
  144.1.209.2 > icsdnet.112.220
  office.2 > icsd-net.112.220
  jssmag.149.235 > icsd-net.2
(If the /etc/atalk.names doesn't exist or doesn't contain
an entry for some appletalk host/net number, addresses are
printed in numeric form.) In the first example, NBP (DDE
port 2) on net 144.1 node 209 is sending to whatever is
listening on port 220 of net icsd node 112. The second
line is the same except the full name of the source node
is known ('office'). The third line is a send from port
235 on net jssmag node 149 to broadcast on the icsd-net
NBE port (note that the broadcast address (255) is mdi
cated by a net name with no host number - for this reason
it's a good idea to keep node names and net names distinct
in /etc/atalk.names).
NBP (name binding protocol) and ATE (Appletalk transaction
protocol) packets have their contents interpreted. Other
protocols just dump the protocol name (or number if no
name is registered for the protocol) and packet size.
NBP packets are formatted like the following examples:
  techpit.2 > icsd-net.112.220: nbp-reply 190:
"techpit:LaserWriter@*"186
The first line is a name lookup request for laserwriters
sent by net icsd host 112 and broadcast on net jssmag.
The nbp id for the lookup is 190. The second line shows a
reply for this request (note that it has the same id) from
host jssmag.209 saying that it has a laserwriter resource
named "RM1140" registered on port 250. The third line is
another reply to the same request saying host techpit has
laserwriter "techpit" registered on port 186.
ATE packet formatting is demonstrated by the following
example:
  jssmag.209.165 > helios.132: atp-req 12266<0-7> 0xae030001
  helios.132 > jssmag.209.165: atp-resp 12266:0 (512)
0xae040000
  helios.132 > jssmag.209.165: atp-resp 12266:1 (512)
0xae040000
  helios.132 > jssmag.209.165: atp-resp 12266:2 (512)
0xae040000
  helios.132 > jssmag.209.165: atp-resp 12266:3 (512)
0xae040000
  helios.132 > jssmag.209.165: atp-resp 12266:4 (512)
0xae040000
  helios.132 > jssmag.209.165: atp-resp 12266:5 (512)
0xae040000
  helios.132 > jssmag.209.165: atp-resp 12266:6 (512)
0xae040000
  helios.132 > jssmag.209.165: atp-resp*12266:7 (512)
0xae040000
  jssmag.209.165 > helios.132: atp-req 12266<3,5> 0xae030001
  helios.132 > jssmag.209.165: atp-resp 12266:3 (512)
0xae040000
  helios.132 > jssmag.209.165: atp-resp 12266:5 (512)

TABLE 1-continued

Tcpdump Man Page

0xae040000
    jssmag.209.165 > helios.132: atp-rel 12266<0-7> 0xae030001
    jssmag.209.133 > helios.132: atp~req* 12267<0-7> 0xae030002
Jssmag.209 initiates transaction id 12266 with host helios
by requesting up to 8 packets (the '<0-7>'). The hex num-
ber at the end of the line is the value of the 'userdata'
field in the request.
Helios responds with 8 512-byte packets. The ':digit'
following the transaction id gives the packet sequence
number in the transaction and the number in parens is the
amount of data in the packet, excluding the atp header.
The '*' on packet 7 indicates that the FOM bit was set.
Jssmag.209 then requests that packets 3 & 5 be retransmit-
ted. Helios resends them then jssmag.209 releases the
transaction. Finally, jssmag.209 initiates the next
request. The '*' on the request indicates that XO
('exactly once') was not set.
IP Fragmentation
Fragmented Internet datagrams are printed as
    (frag id:size@offset+)
    (frag id:size@offset)
(The first form indicates there are more fragments. The
second indicates this is the last fragment.)
offset (in bytes) in the original datagram.
The fragment information is output for each fragment. The
first fragment contains the higher level protocol header
and the frag info is printed after the protocol info.
Fragments after the first contain no higher level protocol
header and the frag info is printed after the source and
destination addresses. For example, here is part of an
ftp from arizona.edu to lbl-rtsg.arpa over a CSNET connec-
tion that doesn't appear to handle 576 byte datagrams:
    arizona.ftp-data > rtsg.1170: . 1024:1332(308) ack 1 win
4096 (frag 595a:328@0+)
    arizona > rtsg: (frag 595a:204@328)
    rtsg.1170 > arizona.ftp-data: . ack 1536 win 2560
There are a couple of things to note here: First,
addresses in the 2nd line don't include port numbers.
This is because the TCP protocol information is all in the
first fragment and we have no idea what the port or
sequence numbers are when we print the later fragments.
Second, the tcp sequence information in the first line is
printed as if there were 308 bytes of user data when, in
fact, there are 512 bytes (308 in the first frag and 204
in the second). If you are looking for holes in the
sequence space or trying to match up acks with packets,
this can fool you.
A packet with the IP don't fragment flag is marked with a
trailing (DF).
Timestamps
By default, all output lines are preceded by a timestamp.
The timestamp is the current clock time in the form
    hh:mm:ss.frac
and is as accurate as the kernel's clock. The timestamp
reflects the time the kernel first saw the packet. No
attempt is made to account for the time lag between when
the ethernet interface removed the packet from the wire
and when the kernel serviced the 'new packet' interrupt.
SEE ALSO
    traffic(1C), nit(4P), bpf(4), pcap(3)
AUTHORS
    The original authors are:
    Van Jacobson, Craig Leres and Steven McCanne, all of the
    Lawrence Berkeley National Laboratory, University of Cali-
    fornia, Berkeley, CA.
    It is currently being maintained by tcpdump.org.
    The current version is available via http:
    The original distribution is available via anonymous ftp:
        ftp://ftp.ee.lbl.gov/tcpdump.tar.Z
    IPv6/IPsec support is added by WIDE/KAME project. This
    program uses Eric Young's SSLeay library, under specific
    configuration.
BUGS
    Please send problems, bugs, questions, desirable enhance-
    ments, etc. to:
        tcpdump-workers@tcpdump.org
    Please send source code contributions, etc. to:

TABLE 1-continued

Tcpdump Man Page patches@tcpdump.org
    NIT doesn't let you watch your own outbound traffic, BPF
    will. We recommend that you use the latter.
    On Linux systems with 2.0[.x] kernels:
        packets on the loopback device will be seen twice;
        packet filtering cannot be done in the kernel, so
        that all packets must be copied from the kernel in
        order to be filtered in user mode;
        all of a packet, not just the part that's within
        the snapshot length, will be copied from the kernel
        (the 2.0[.x] packet capture mechanism, if asked to
        copy only part of a packet to userland, will not
        report the true length of the packet; this would
        cause most IP packets to get an error from tcp
        dump).
    We recommend that you upgrade to a 2.2 or later kernel.
    Some attempt should be made to reassemble IP fragments or,
    at least to compute the right length for the higher level
    protocol.
    Name server inverse queries are not dumped correctly: the
    (empty) question section is printed rather than real query
    in the answer section. Some believe that inverse queries
    are themselves a bug and prefer to fix the program gener-
    ating them rather than tcpdump.
    A packet trace that crosses a daylight savings time change
    will give skewed time stamps (the time change is ignored)
    headers assume that all FDDI and Token Ring packets are
    SNAP-encapsulated Ethernet packets. This is true for IP,
    ARP, and DECNET Phase IV, but is not true for protocols
    such as ISO CLNS. Therefore, the filter may inadvertently
    accept certain packets that do not properly match the fil-
    ter expression.
    Filter expressions on fields other than those that manipu-
    late Token Ring headers will not correctly handle source-
    routed Token Ring packets.
    ip6 proto should chase header chain, but at this moment it
    does not. ip6 protochain is supplied for this behavior.
    Arithmetic expression against transport layer headers,
    like tcp[0], does not work against IPv6 packets. It only
    looks at IPv4 packets.

(end man page)

SUMMARY

Latency in IP networks is determined by sensing a packet header, determining the packet status, creating a hashed record, and calculating the time delay between a previous sensing of the packet and a corresponding ACK. The packet header is sensed on a physical layer interface (e.g., int 0), and a determination is made of the sensed packet status. In the case of a sensed packet, a hashed record is created of the packet header and the local clock time when the packet was sensed. A determination is made if the packet represents an acknowledgement (ACK) to a previously sensed TCP packet. If the packet represents an ACK to a previously sensed packet, a time delay between the previous sensing of the packet and the ACK is calculated. The time delay is the TCP ACK Round Trip Time (TCP RTT).

According to a particular aspect, the delay between the previous sensing of the packet and the ACK is used to generate an output round trip time (RTT) as a first interface RTT to provide an indication of the latency.

According to another aspect, sensed packet data is received from a second physical layer interface (e.g., int 1). Identification is made if the packet data from the second physical layer interface corresponds to a packet in the hashed record of another physical interface (e.g., int 0), and a time difference between sensing of the packet at the two interfaces is determined. The time difference, after properly accounting for clock offset between the two hosts housing the two interfaces, is the One-Way Flight Time of the packet.

DETAILED DESCRIPTION

Overview

Figure 1:
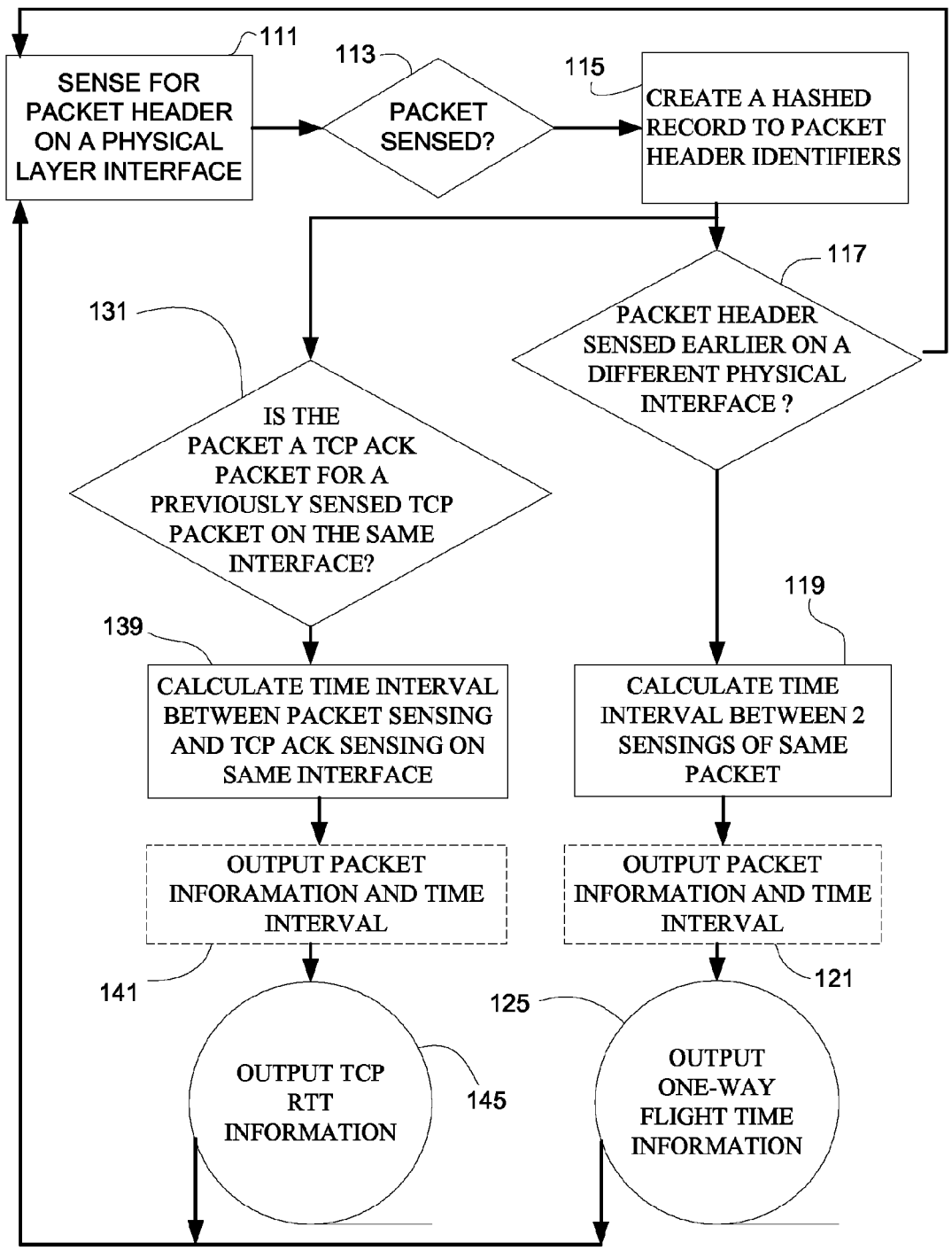
FIG. 1 is a flow diagram showing the operation of the program.

The present system addresses a need of the operation and tactical community to gather accurate data concerning network performance, in as close to real time as possible. The system allows diagnosis of operational networks and systems. It is further advantageous in that accurate and standardized datasets of network performance are provided for verification, validation and accreditation of modeling and simulation programs.

The present system operates on tcpdump and CAIDA's Coral Reef software stacks. The system is implemented by a routine called crl_delay.c. The crl_delay.c module records the one-way latency of each packet between two interfaces when both ports have seen the passage of the same packet. The system also records the latency or TCP Round Trip Time (RTT) for all TCP packets at any one Ethernet port. When Boolean conditions are met for a packet, or a packet is received with an ACK, relevant information on the packets are tabulated for TCP connections observed as open during the run.

The relevant information on the packets may include
a. the source and destinations IP addresses and ports
b. sequence numbers
c. information related to sequence numbers, such as connection start time, connection duration, number of packets during the connection and derived means and standard deviations of latencies This information is tabulated for each TCP connection observed as open during the run. Similar information for packets of other observed protocols observed such as UDP or ICMP are also recorded, and are provided as real time and as End of Run Statistics (EORS).

Operation

FIG. 1 is a flow diagram showing the operation of a one- and two-way packet flight time protocol enhancement as used in connection with tcpdump. The enhancement has a hook 111 which invokes a sense for packet header on a physical layer interface. The hook 111 can be tcpdump or another suitable program.

A determination 113 is made as to whether a packet is sensed. In the event of the packet being sensed, a hashed record is created 115. Upon creation of the hashed record, a determination 117 is made as to whether the sensed packet was sensed earlier on a different interface.

If the packet was sensed earlier, a calculation 119 of a time interval between the two sensing of the same packet is made, along with output packet information and time interval if desired. This information is output 121 as the one-way flight time for the data packet.

Also in response to the creation 115 of the hashed record, a determination 131 is made as to whether the packet is a TCP ACK from a previously sensed TCP packet on the same interface. If the packet is a TCP ACK from a previously sensed TCP packet on the same interface, a calculation 139 of the time interval between the original packet sensing and the ACK is made. This information is output 141 as the output TCP RTT information.

In response to a false at determinations 113, 117 or 131, the program returns to its hook 111 which invokes a sense for packet header on a physical layer interface.

The determinations provide an ability to assign time intervals between IP packet arrival events at each available interface in an IP network. Time correlation studies of packet departure and arrival times can be made and can be used to further enhance IP protocol and performance analysis. The basic data required for such studies is available in complete detail from outputs 121 and 141.

In cases where separate instantiations of the process are run on machines with independent clocks, a proper accounting must be made for multiple clock asynchronies.

The program operates on Unix-based platforms, such as Unix, Linux, BSD.

The system provides an ability to measure IP packet flight times between two IP interfaces. It provides an ability to measure TCP Round Trip Times (TCP RTTs) on a single interface. As a result, it provides ease of analyzing and archiving live network data for later reference in further analysis.

Conclusion

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A method for determining latency in IP networks, the method comprising:
    sensing a packet header on a first physical layer interface (e.g., int 0);
    determining a sensed packet status;
    in the case of a sensed packet, creating a hashed record of said packet header and the local clock time corresponding to sensing said packet;
    determining if said packet represents an acknowledgement (ACK) to a previously sensed TCP packet;
    in the case of said packet representing an ACK to a previously sensed packet, calculating a time delay between the previous sensing of said packet and said ACK;
    receiving sensed packet data from a second physical layer interface (e.g., int 1);
    identifying if said sensed packet data from said second physical layer interface corresponds to a packet in said hashed record of said first physical interface layer (e.g., int 0); and
    identifying a time difference between sensing said packet at said first physical interface layer and said second physical interface layer to determine the One-Way Flight Time between said first physical interface layer and said second physical interface layer.

2. The method of claim 1, further comprising said time delay provided as an indication of the TCP ACK Round Trip Time (TCP RTT).

3. The method of claim 2, further comprising using said delay between said previous sensing of said packet and said ACK to generate an output round trip time (RTT) as a first interface RTT to provide an indication of the latency.

4. The method of claim 1, further comprising referring to said time delay between said previous sensing of said packet and said ACK as the TCP ACK Round Trip Time (TCP RTT).

5. The method of claim 1, further comprising including in said hashed record to said packet header source address, protocol, source identification, destination identification, sequence number and length.

6. The method of claim 1, further comprising responding to the first and second interfaces sensing passage of one packet, determining a one-way latency of said packet as the determination of the one-way latency.

7. The method of claim 1, further comprising:

recording a one-way latency of at least one of said sensed packets between a first interface RTT and a second interface RTT for said packet data obtained from said second physical layer interface;

upon meeting Boolean conditions for a packet or packet plus ACK, providing information concerning said packet;

comparing further instances of said first interface RTT and said second interface RTT for subsequent packets; and at a predetermined time, providing an output derived from the information concerning said packets.

8. The method of claim 7, further comprising including in the information concerning said packet header source address, protocol, source identification, destination identification, sequence number and length.

9. The method of claim 1, further comprising sensing said packet header on said first physical layer interface by using a program having the program functions of the Tcpdump program.

10. A non-transitory computer-readable medium embodied a computer software for execution by a computer, the computer software comprising:

a software instruction for causing said computer to sense a packet header on a physical layer interface (e.g., int 0);

a software instruction for causing said computer to determine a sensed packet status;

a software instruction which, in the case of a sensed packet, creates a hashed record of said packet header and the local clock time corresponding to sensing said packet;

a software instruction for causing said computer to determine if said packet represents an acknowledgement (ACK) to a previously sensed TCP packet;

a software instruction which, in the case of said packet representing an ACK to a previously sensed packet, causes said computer to calculate a time delay between the previous sensing of the packet and said ACK;

a software instruction for causing said computer to receive said sensed packet data from a second physical layer interface (e.g., int 1), identify if said packet data from said second physical layer interface corresponds to a packet in a hashed record of another physical layer interface (e.g., int 0) and determine a time difference between sensing of said packet at said two interfaces, a second interface RTT for said packet data from said second physical layer interface; and a software instruction for causing said computer to use a time interval between the first interface RTT and the second interface RTT to determine a one-way latency, said time difference provided as the One-Way Flight Time of said packet, after properly accounting for clock offset between the two hosts housing said two interfaces.

11. The computer-readable medium of claim 10, further configured with an output instruction providing said time delay between said previous sensing of said packet and said ACK as an indication of TCP ACK Round Trip Time (TCP RTT).

12. The computer-readable medium of claim 10, further configured with a software component to use said delay between said previous sensing of said packet and said ACK to generate an output round trip time (RTT) as a first interface RTT to provide an indication of latency.

13. The computer-readable medium machine of claim 10, further configured with a software component comprising an instruction for causing the computer to include in said hashed record to said packet header source address, protocol, source identification, destination identification, sequence number and length.

14. The computer-readable medium of claim 10, further comprising an instruction for causing said computer to provide an output corresponding to said time difference between said sensing of said packet at said two interfaces, the output provided as the One-Way Flight Time of said packet, after properly accounting for clock offset between the two hosts housing said two interfaces.

* * * * *